United States Patent [19]

Takahashi

[11] 4,100,407

[45] Jul. 11, 1978

[54] PHOTOELECTRIC CONVERSION CIRCUIT

[75] Inventor: Akinori Takahashi, Tokyo, Japan

[73] Assignee: Nippon Electric Co., Ltd., Tokyo, Japan

[21] Appl. No.: 809,773

[22] Filed: Jun. 24, 1977

[30] Foreign Application Priority Data

Jun. 28, 1976 [JP] Japan .................................. 51-76270

[51] Int. Cl.² .............................................. H01J 39/12
[52] U.S. Cl. ............................ 250/214 P; 250/214 A; 250/206; 354/60 R
[58] Field of Search ............ 250/206, 214 A, 214 AL, 250/214 B, 214 C, 214 P, 214 SW, 214 R; 354/60 R

[56] References Cited

U.S. PATENT DOCUMENTS

| | | | |
|---|---|---|---|
| 3,843,880 | 10/1974 | Tsuchigasu | 250/214 R |
| 3,873,827 | 3/1975 | Krause | 250/214 P |
| 3,895,230 | 7/1975 | Itagaki | 250/214 P |

Primary Examiner—David C. Nelms
Assistant Examiner—Michael J. Tokar
Attorney, Agent, or Firm—Hopgood, Calimafde, Kalil, Blaustein & Lieberman

[57] ABSTRACT

A novel form of photoelectric conversion circuit including a photo sensor is provided, which is very limited in response time even at low illuminations and highly valuable for use in automatic cameras. It comprises a comparator for comparing the output voltage of the operational amplifier, connected to the photo sensor, with a reference voltage, and discharging means operable under the control of the comparator quickly to discharge the charge stored in a parasitic capacitor of the photo sensor when the circuit is energized for operation.

2 Claims, 2 Drawing Figures

PHOTOELECTRIC CONVERSION CIRCUIT

BACKGROUND OF THE INVENTION

This invention relates generally to circuits for converting light into electricity and more particularly to those of the type usable on cameras for automatic exposure control.

In a photoelectric conversion circuit in which a photo sensor, for example, a photodiode, is employed, an electric charge is stored in the photodiode because of its junction capacitance when a source of power supply is applied in the circuit for operation and conventionally such electric charge can only be discharged by the photo-output current of the photodiode. Because of this, particularly in the case where the illumination at the light-receiving area is so limited as to cause the photodiode to produce an output current of an order of pico-ampere, a considerable length of time has been required for the circuit output to reach the level corresponding to the given photo-output current and this has involved a disadvantage that the circuit can operate only with a correspondingly extended response time.

SUMMARY OF THE INVENTION

Accordingly, an object of the present invention is to provide a new and improved photoelectric conversion circuit which is short in response time compared with prior art circuits and particularly suited for use in automatically exposure-controlling cameras.

According to the present invention, there is provided a photoelectric conversion circuit which comprises a light-receiving element capable of producing a signal corresponding to he illumination given thereto, an operational amplifier having an inverted and a noninverted input terminal connected to the respective opposite terminals of the light-receiving element and producing upon reception of the output signal therefrom an output voltage corresponding to the output signal, a comparator arranged to compare the output voltage of the operational amplifier with a predetermined reference voltage, and discharge means for discharging electric charges stored in the parasitic capacitance to the opposite terminals of the light receiving element under the control of the output of the comparator.

In the circuit arrangement described, an electric charge is stored in the parasitic capacitance of the light-receiving element, such as a junction capacitance of a photodiode, when a source of power supply is applied in the circuit and, in the case where the illumination is limited to such an extreme extent that the charge cannot be discharged through the light-receiving element, the operational amplifier produces an output, for example, of high level, in response to the charge stored.

In this connection, if the reference voltage is set at a level lower than the high level output of the operational amplifier, it is to be noted that the comparator will produce an output of such a level as to render the discharge means conductive, thus allowing the charge stored in the light-receiving element or photo sensor to be quickly discharged by the discharge means. This enables the operational amplifier to produce an output as determined by the magnitude of the output signal from the light-receiving element or photo sensor. On this occasion, if the reference voltage preset for comparison is higher than the then level of the amplifier output, the output of the comparator is reversed to render the discharge means nonconductive, with the result that the photoelectric conversion circuit is placed in its normal state of operation.

For better understanding of the present invention, it will be described hereinafter in more detail with reference to the accompanying drawing.

DESCRIPTION OF THE PREFERRED EMBODIMENT

Figure 1:
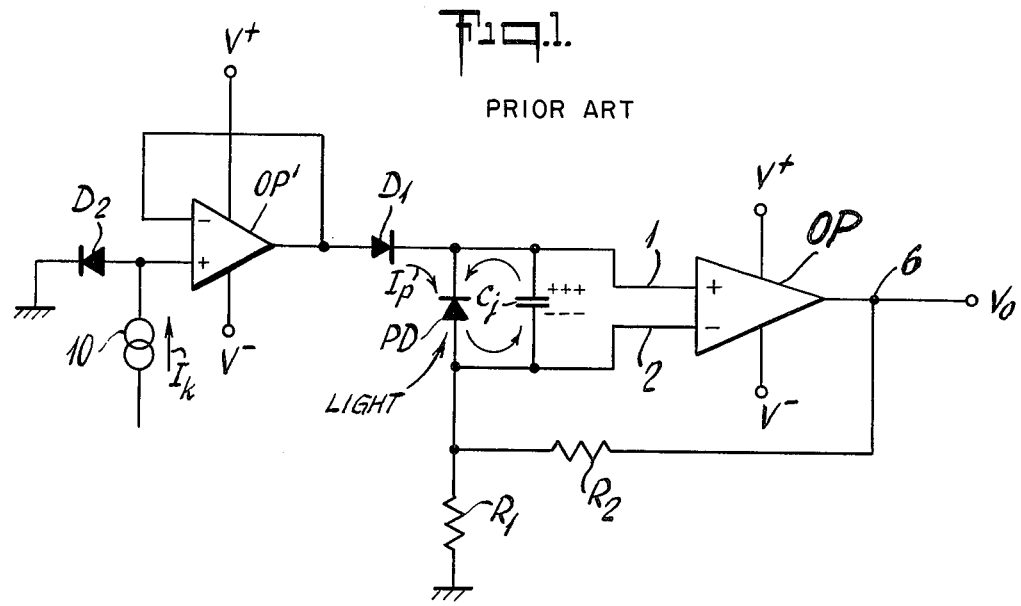
FIG. 1 is a schematic block diagram of a conventional form of photoelectric conversion circuit.

At the first, description will be made with reference to FIG. 1, in which is illustrated a conventional form of photoelectric conversion circuit of the logarithmic type extensively used in automatic exposure control type cameras and capable of effectively coverting quantities of incident light into corresponding electric quantities in a wide range of illumination (from $10^6$ to $10^7$ in illumination ratio) including that of a candle light at the lowest and that of sunlight in the middle of summer at the highest.

Included in the circuit is an operational amplifier OP' the output of which is fed back to the inverted input terminal of the amplifier. The noninverted input terminal of the amplifier OP' is grounded through a diode $D_2$, the anode of which is connected to the noninverted input terminal, and is connected to a source of power supply 10 to be fed with a current $I_k$. As shown, the output of the operational amplifier OP' is connected to the noninverted input terminal 1 of another operational amplifier OP through a diode $D_1$, the cathode of which is connected to the amplifier terminal 1. A photodiode PD is arranged with its anode and cathode connected, respectively, to the inverted and noninverted input terminals 2 and 1. The anode of the photodiode PD is grounded through a resistance $R_1$ while being connected to the output terminal of the operational amplifier OP through a resistance $R_2$. As indicated by $V_0$, the output voltage of the circuit illustrated appears at the output terminal 6 of the operational amplifier OP.

In this circuit arrangement, the diode $D_1$ serves as a log diode for converting the photo-output current of photodiode PD into a voltage, while diode $D_2$ is a diode provided to compensate the temperature characteristic of the forward voltage of log diode $D_1$. Resistances $R_1$ and $R_2$ have the functions of determining the voltage gain of the photoelectric conversion circuit and compensating the temperature coefficient of the forward voltage of log diode $D_1$, which varies with the forward current therethrough.

With the arrangement described, the output voltage $V_0$ obtainable with an illumination L at the light-receiving area of photodiode PD is expressed as follows:

$$V_0 = (R_1 + R_2)/R_1 \cdot (kT/q) \cdot ln\ [I_k/I_p] \qquad (1)$$

where $I_p$ represents the photo-output current of photodiode PD under illuminaation L, $I_k$ represents the forward current flowing through the temperature compensating diode $D_2$, $k$ represents the Boltzmann constant, and $q$ represents the electron charge. As seen from this formula, the photo-output current $I_p$, flowing through the photodiode PD, is logarithmically converted in a wide range. The value of forward current $I_k$ of diode $D_2$ is to be selected in the range, $I_k \gtreqqless I_p$ max, where $I_p$ max represents the maximum value of photo-output current $I_p$.

As will be readily understood the operational amlifier OP is of the high input impedance type, having an insulator gate type field-effect transistor provided at its input, as it deals with a photo-output current $I_p$ ranging to an order of pico-ampere.

Now, when the power source is applied to the circuit, the junction capacitor $C_j$ of photodiode PD is charged as indicated in FIG. 1 and thus the output of the operational amplifier Op is immediately held at a high level close to the positive source voltage $V^+$. In the event that the output current from the photodiode PD is substantial, the junction capacitor $C_j$ is rapidly discharged to cause the circuit output to return to the voltage value as determined by the formula (1). On the other hand, when the illumination at the photodiode area is limited and the photo-output current $I_p$ produced is correspondingly small, the time required for the charge stored in the junction capacitor $C_j$ to be discharged is extended so that the output of the operational amplifier OP remains held at the high level and an extremely limited speed of response results. This phenomenon constitutes a fatal deficiency of the photoelectric conversion circuit in practical applications and particularly in cases where such circuit is used for automatic exposure control of cameras.

Description will next be made of the preferred embodiment of the present invention illustrated in FIG. 2, in which the same reference letters and numerals have been used as in FIG. 1 for equivalent parts.

Figure 2:
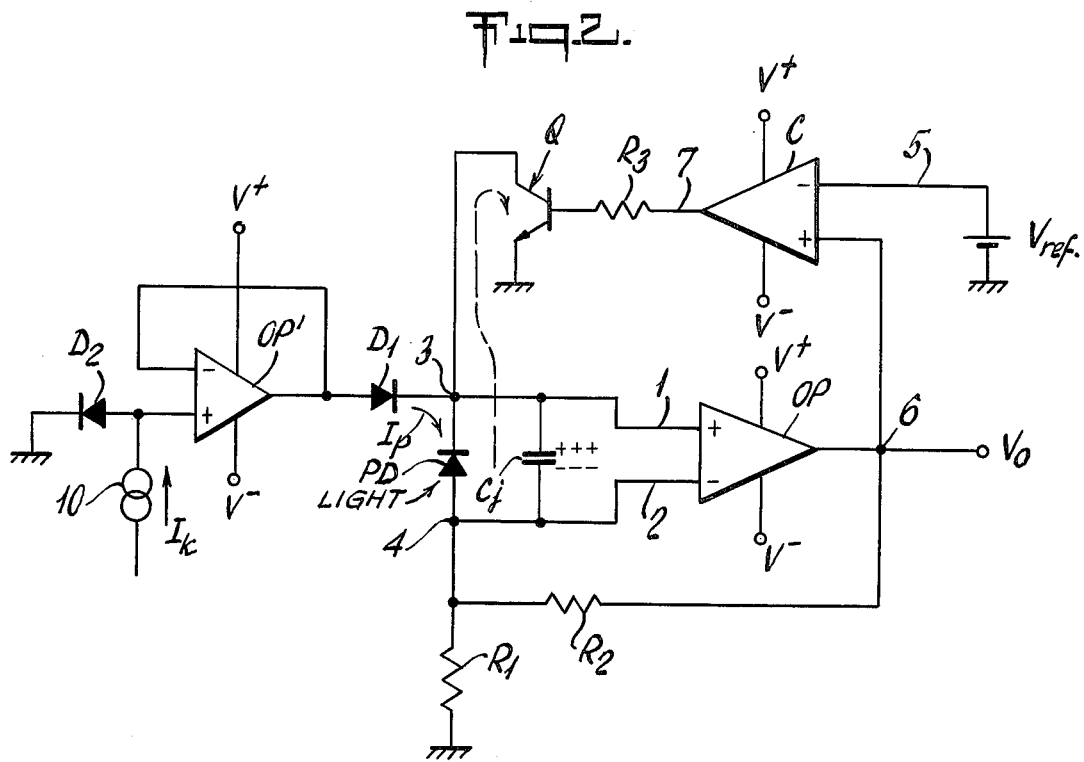
FIG. 2 is a diagram illustrating a preferred embodiment of the present invention.

The circuit of FIG. 2 includes comparator C which is connected at one of its input terminals to the output 6 of operational amplifier OP and is fed at the other input terminal with a reference voltage $V_{ref}$.

The output 7 of the comparator C is connected through a resistance $R_3$ to the base of a transistor Q. The collector of the transistor Q is connected to the cathode of photodiode PD and the emitter thereof is grounded.

In this arrangement, one of the two inputs to the comparator C, reference voltage $V_{ref}$, is selected in the range indicated by the following formula:

$$(R_1 + R_2)/R_1 \cdot KT/q \cdot \ln I_k/I_p \min < V_{ref} < V_o \max \quad (2)$$

where $I_p$ min represents the minimum value of $I_p$ usable as a photo-output current of photodiode PD, and $V_o$ max represents the maximum output voltage of the operational amplifier OP, which is obtainable when the voltage at the noninverted input terminal 1 of the amplifier is larger than at the inverted input terminal 2 thereof.

In operation, when the source of power supply is applied, the junction capacitor $C_j$ of photodiode PD is charged so that the noninverted terminal 1 of operational amplifier OP becomes positive, as shown in FIG. 2. Simultaneously with this, the output 6 of amplifier OP is held at $V_o$ max and, accordingly, the output of comparator C is raised to its high level, rendering the transistor Q conductive. As the consequence, the charge stored in the junction capacitor $C_j$ of photodiode PD is discharged rapidly through the transistor Q, and the output of operational amplifier OP is restored to the level as determined by the formula (1).

Simultaneously with this, the output of comparator C falls to its low level rendering the transistor Q nonconductive, and in this manner the comparator C and transistor Q are electrically disconnected from the photoelectric conversion circuit. Incidentally, in cases where such an illumination level or amount of incident light as resulting in a photo-output current $I_p$ of an order of pico-ampere is to be taken into consideration, it is necessary that the leakage current at the noninverted input terminal 2 of operational amplifier OP and also the collector leakage current of transistor Q in the non-conductive state should be limited to below the minimum value of the photo-output current.

In the above description, a transistor Q of the bipolar type has been employed as discharging means for discharging the charge stored in the junction capacitor but it will be obvious that any other switching element such as a field-effect transistor may also be used with the same successful result. In this case a drain of the field effect transistor is connected to the noninverted input terminal of the amplifier OP or the cathode of the photo-diode. The source thereof is grounded and a gate is connected to the output of the comparator C through the resistor $R_3$.

It will be readily appreciated from the foregoing description that, in the photoelectric conversion circuit of the present invention, the discharge means such as a bipolar transistor Q is rendered ON of OFF rapidly under the control of comparator C so that any charges stored in the parasitic capacitor of the photo sensor when the circuit is energized is discharged very rapidly, thus enabling the circuit to operate with an extraordinarily high speed of response. In order to extend the photometering range of the circuit, it is desirable to minimize the leak current at the noninverted input terminal of the operational amplifier OP so that the minimum effective value of photo-output current is reduced accordingly.

Further, it will readily be recognized that use of such photoelectric conversion circuit, for example, in the photoelectric exposure control of cameras makes it extremely easy to realize an automatic exposure control effective even at lower illuminations with its range of control extended to the low illumination side.

What is claimed is:

1. A photoelectric conversion circuit comprising a light-receiving element having a parasitic capacitance and producing a signal corresponding to the illumination given thereto, an amplifier having a first and a second terminal connected to the respective terminals of said light-receiving element and producing upon reception of the output signal of said light-receiving element an output voltage corresponding to said output signal, a comparator for comparing the output voltage of said amplifier with a reference voltage, and means for discharging an electric charge stored in said parasitic capacitance of said light-receiving element under the control of the output of said comparator.

2. The photoelectric conversion circuit of claim 1, wherein said discharging means comprises a bipolar transistor, a collector thereof being connected to one terminal of said light-receiving element, an emitter thereof being connected to the common potential, and a base thereof being connected to the output of said comparator.

* * * * *